(12) United States Patent
Phipps

(10) Patent No.: US 7,807,929 B2
(45) Date of Patent: *Oct. 5, 2010

(54) LEAD

(75) Inventor: Anthony B Phipps, Uttoxeter (GB)

(73) Assignee: Rolls-Royce plc, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 12/318,939

(22) Filed: Jan. 13, 2009

(65) Prior Publication Data

US 2009/0120667 A1 May 14, 2009

Related U.S. Application Data

(63) Continuation of application No. 10/832,420, filed on Apr. 27, 2004, now Pat. No. 7,528,324.

(30) Foreign Application Priority Data

May 20, 2003 (GB) ................................. 0311540.9

(51) Int. Cl.
*H01B 5/14* (2006.01)
(52) U.S. Cl. .................................. 174/126.4
(58) Field of Classification Search ............. 174/126.4, 174/261, 268; 403/292
See application file for complete search history.

(56) References Cited

U.S. PATENT DOCUMENTS 3,763,551 A 10/1973 Herron
4,104,605 A 8/1978 Boudreaux
4,185,496 A 1/1980 Tisone
4,221,649 A 9/1980 Tisone
4,577,976 A 3/1986 Hayashi
4,722,609 A 2/1988 Epstein
4,959,258 A * 9/1990 Yoshida et al. .............. 428/192
4,969,956 A 11/1990 Kreider
5,103,172 A 4/1992 Stoll
5,215,597 A 6/1993 Kreider
5,474,619 A 12/1995 Kreider
5,979,243 A 11/1999 Lei
6,037,645 A 3/2000 Kreider
7,528,324 B2 * 5/2009 Phipps .................... 174/126.4

* cited by examiner

*Primary Examiner*—Chau N Nguyen
(74) *Attorney, Agent, or Firm*—Jeffrey S. Melcher; Manelli Denison & Selter PLLC

(57) ABSTRACT

A lead for transmitting an electrical signal within a gas turbine engine, from a node at a first part of the gas turbine engine having a first surface to a second part of the gas turbine engine having a second surface, wherein the first part and the second part are coupled at a compressed joint, wherein the lead comprises: a node on the first surface of the first part; a first interconnect, adhered to the first surface of the first part; and a second interconnect, adhered to the second surface of the second part, wherein the first interconnect and the second interconnect abut at the compressed joint to provide, by their contact, a continuous electrical connection from the node to the second part.

10 Claims, 4 Drawing Sheets

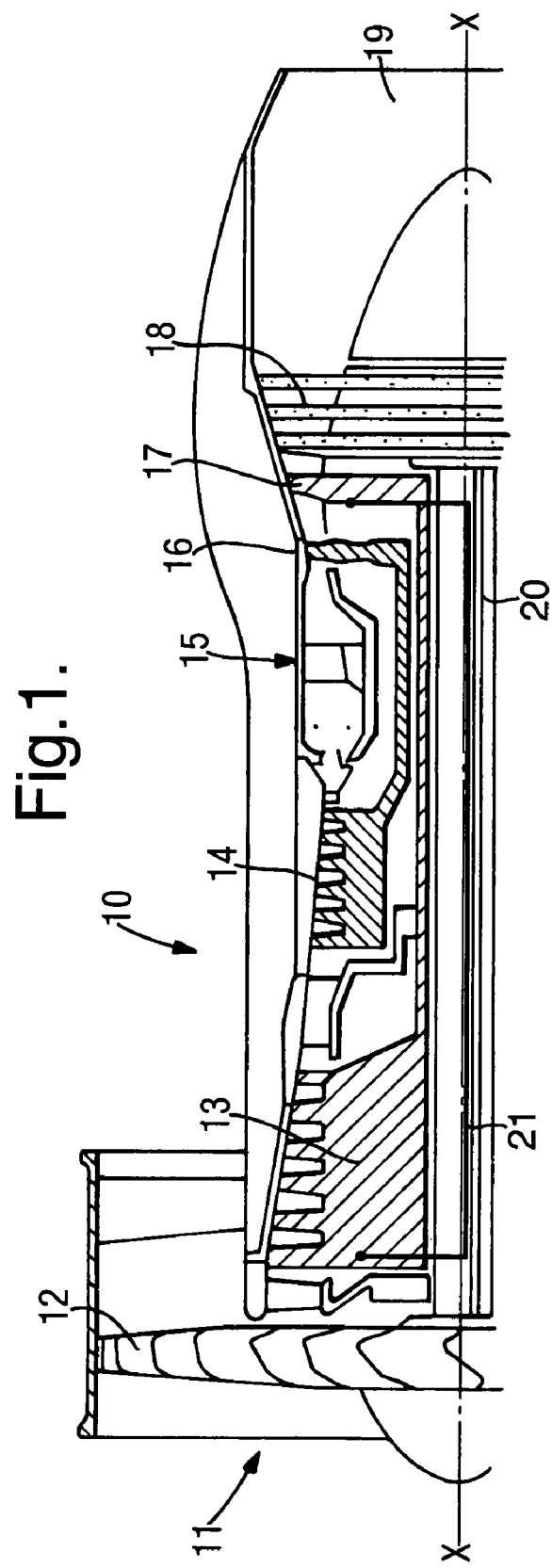

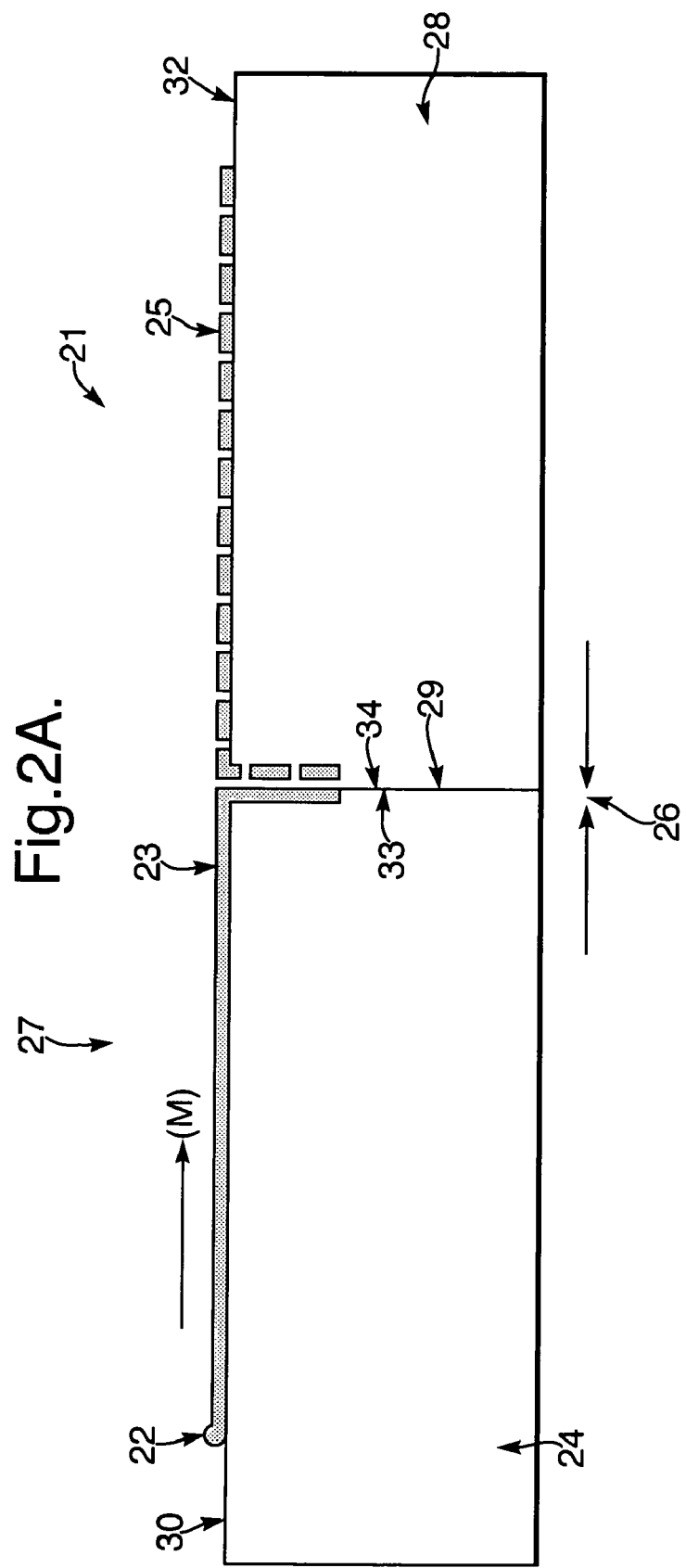

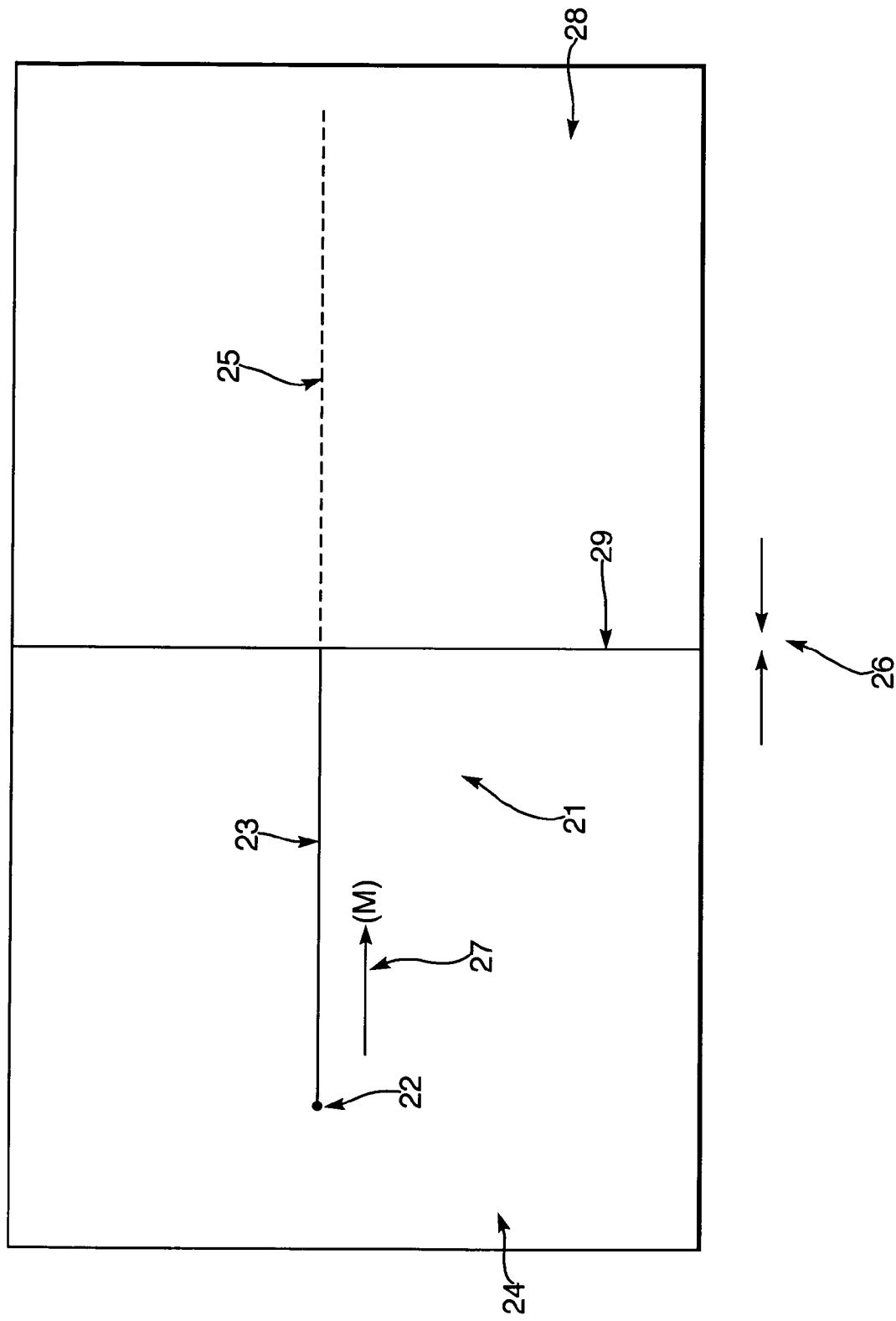

LEAD

CROSS-REFERENCE TO RELATED APPLICATIONS

This is a continuation of U.S. application Ser. No. 10/832,420, filed Apr. 27, 2004, now U.S. Pat. No. 7,528,324, which claims priority to GB 0311540.9, filed 20 May 2003.

Embodiments of the present invention relate to a lead. In particular, they relate to a lead within a gas turbine engine.

BACKGROUND OF THE INVENTION

Gas turbine engines are commonly used as aero-engines for aero planes. Each model of an engine is tested to ensure that the parameters of the engine (temperature for example) do not exceed designated threshold values.

During testing, the parameters of the engine must be measured and transmitted to an operator external to the engine. The measured signal may, for example, be transmitted electromagnetically (using radio wave radiation for example) via a transmitter to an operator. This is not possible, however, in high temperature regions of an aero engine where the transmitter would be destroyed by the high temperatures. Therefore the measured signal is transmitted through a wire from the high temperature region to a transmitter in a cooler region (the compressor stage\stages for example). Holes have to be drilled through which to lead the wires. The holes however, shorten the life of the engine significantly and may alter its performance during testing. Additionally, the wires are fixed to the engine by plates to prevent displacement during operation of the engine. The plates are micro-spot welded to the engine. Cracks are often formed through micro-spot welding and shorten the life of an engine. As a result, engines have to be dedicated to testing. This is expensive and an inefficient use of human and manufacturing resources.

It is therefore desirable to provide an improved way of leading out signals from within engines that does not significantly damage the engine or shorten its life.

SUMMARY OF THE INVENTION

According to the present invention there is provided a lead for transmitting an electrical signal within a gas turbine engine, from a node at a first part of the gas turbine engine having a first surface to a second part of the gas turbine engine having a second surface, wherein the first part and the second part are coupled at a compressed joint, wherein the lead comprises: a node on the first surface of the first part; a first interconnect, adhered to the first surface of the first part; a second interconnect, adhered to the second surface of the second part, wherein the first interconnect and the second interconnect abut at the compressed joint to provide, by their contact, a continuous electrical connection from the node to the second part.

Consequently, embodiments of the invention provide an improved way of leading out signals from within the engine that does not significantly damage the engine or shorten its life. The engine may be entered into service during or after testing. This removes the need for dedicated engine builds and reduces manufacturing costs of a gas turbine engine model.

The first and second interconnects may be thin film interconnects. The structure, materials and characteristics of thin film are well known and may be found in U.S. Pat. Nos. 5,474,619; 6,037,645; 4,185,496; 4,221,649; 4,969,956; 5,215,597; 5,979,243; 4,104,605; 4,577,976 and 4,722,609.

The thin film interconnects may have a thickness of less than 0.1 mm and may have a typical thickness in the order of micrometers. Thin film interconnects may be adhered to a surface of the gas turbine engine by a process such as painting, lacquering or photolithography. Thin film interconnects provide the benefit that they allow an electrical signal to be lead-out through a compressed joint. This removes the need for drilling holes through which to lead out the electrical signal. Since the thin film interconnect is adhered to the surface of the engine, it removes the usage of plates and micro-spot welding. Therefore, the use of thin film interconnects does little damage to an engine and has little effect on the performance of the engine during testing. If the thin film interconnects are expelled from the engine due to wear, they cause little to no damage to the engine.

The compressed joint may be an already existing compressed joint within the gas turbine engine. For example, the compressed joint may be a compressed joint between two portions of an interconnecting shaft. The compressed joint may be stationary or rotating. The first part may be rotating relative to the second part. The second part may be rotating relative to the first part. The first part and the second part may be rotating but are stationary relative to one another. Therefore, an electrical signal can be lead out through rotating parts.

The first part of the engine may have a greater temperature than the second part of the engine. The first part may be a high temperature region and may have an operational temperature in the range 200° C. to 800° C. The second part may be a low temperature region and may have an operating temperature in the range of "ambient temperature" to 750° C. An example of a high temperature region of a gas turbine engine is the turbine stage(s). An example of a low temperature region of a gas turbine is the compressor stage(s). Therefore the abutment of the first and second interconnects provides the benefit of a continuous electrical connection between a high temperature region and a low temperature region. This allows the transmission of an electrical signal from a high temperature region to an operator external to the gas turbine engine, via the low temperature region.

A spool within a gas turbine engine may include a turbine stage(s), a compressor stage(s) and an interconnecting shaft.

The thin film interconnects may comprise gold or platinum or any other suitable material. Gold and platinum are suitable materials for adhering to an engine because they cause very little corrosive damage to the engine.

Thin film interconnects may be run at any angle and connected at any compressed joint within a gas turbine engine. They may be run through either the inside or the outside of an interconnecting shaft. This allows for the most economic route to be chosen through the engine. They may be installed during initial post-manufacture testing or at an engine overhaul. Additionally, engines do not need to be designed to take the thin film interconnects into account.

BRIEF DESCRIPTION OF THE DRAWINGS

For a better understanding of the present invention reference will now be made by way of example only to the accompanying drawings in which:

FIG. 1 illustrates a sectional side view of a gas turbine engine;

FIG. 2A illustrates a side view schematic diagram of a lead according to one embodiment of the present invention;

FIG. 2B illustrates a plan view of the schematic diagram in FIG. 2A;

DETAILED DESCRIPTION OF THE INVENTION

Figure 3:
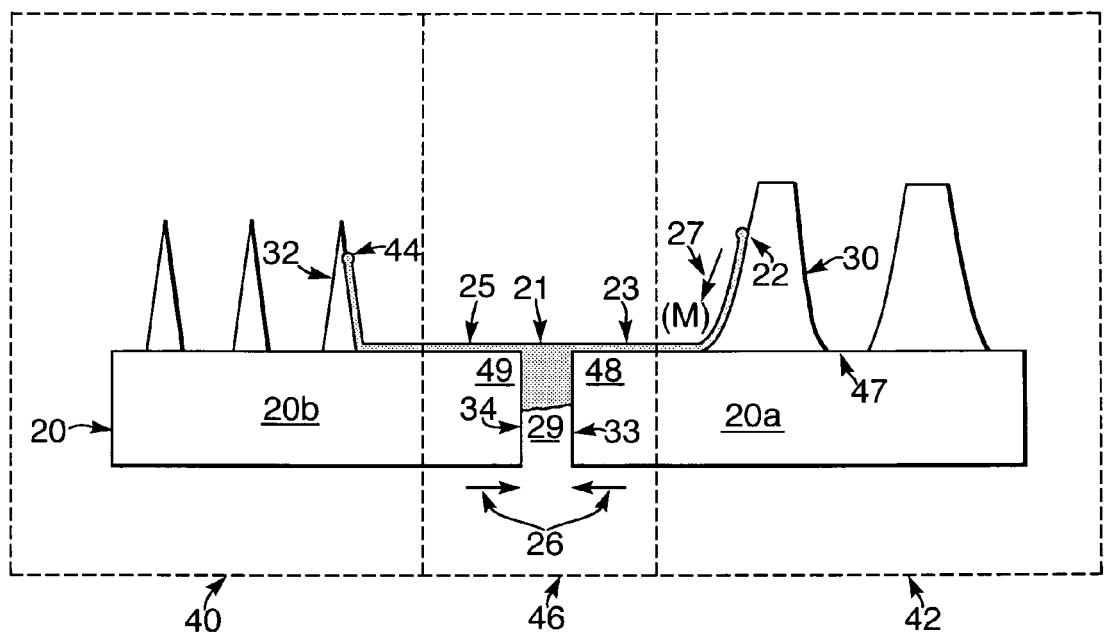
FIG. 3 illustrates a sectional side view of a gas turbine engine according to one embodiment of the present invention.

The figures illustrate a lead 21 for transmitting an electrical signal 27 within a gas turbine engine 10, from a node 22 at a first part 24 of the gas turbine engine 10 having a first surface 30 to a second part 28 of the gas turbine engine 10 having a second surface 32, wherein the first part 24 and the second part 28 are coupled at a compressed joint 29, wherein the lead 21 comprises: a node 22 on the first surface 30 of the first part 24; a first interconnect 23, adhered to the first surface 30 of the first part 24; a second interconnect 25, adhered to the second surface 32 of the second part 28, wherein the first interconnect 23 and the second interconnect 25 abut at the compressed joint 29 to provide, by their contact, a continuous electrical connection from the node 22 to the second part 28.

FIG. 1 illustrates a sectional side view of the upper half of a gas turbine engine 10. The gas turbine engine 10 comprises, in axial flow series, an air intake 11, a propulsive fan 12, a compressor arrangement 30 comprising an intermediate pressure compressor 13, a high pressure compressor 14; a combustor 15, a turbine arrangement 32 comprising a high pressure turbine 16, an intermediate pressure turbine 17 and a low pressure turbine 18, an exhaust nozzle 19, an interconnecting shaft 20 and a lead 21.

The gas turbine engine 10 operates in a conventional manner so that air entering in the intake 11 is accelerated by the propulsive fan 12 which produces two air flows: a first air flow into the intermediate pressure compressor 13 and a second air flow which provides propulsive thrust. The intermediate pressure compressor 13 compresses air flow directed into it for delivering air to the high pressure compressor 14 where further compression takes place. The compressed air exhausted from the high pressure compressor 14 is directed into the combustor 15 where it is mixed with fuel and the mixture combusted. The resultant hot combustion products then expand and thereby drive the high, intermediate and low pressure turbines 16, 17, 18 before being exhausted through the nozzle 19 to provide additional propulsive thrust. The high, intermediate and low pressure turbines 16, 17, 18 respectively drive the high and intermediate pressure compressors 14, 13 and the propulsive fan 12 by suitable interconnecting shafts 20.

FIGS. 2A and 2B illustrate a lead 21 for transmitting an electrical signal (M) 27, from a node 22 at a first part 24 of a gas turbine engine to a second part 28 of the gas turbine engine. The lead 21 comprises the node 22, a first interconnect 23, and a second interconnect 25.

The first interconnect 23 is electrically connected to the node 22. The first interconnect 23 is adhered to a first surface 30 and to a third abutment surface 33 of the first part 24. The second interconnect 25 is adhered to a second surface 32 and a fourth abutment surface 34 of the second part 28. The first surface 30 is, in this example, perpendicular to the third abutment surface 33. The second surface 32 is, in this example, perpendicular to the fourth abutment surface 34. A compressed joint 29 is formed by the compressive contact of the first part 24 and the second part 28. At the compressed joint 29, the third abutment surface 33 and the fourth abutment surface 34 are in abutting contact. Arrows 26 indicate the direction of the compression. The first interconnect 23 abuts the second interconnect 25 at the compressed joint 29 to provide a continuous electrical connection between the node 22 and the second interconnect 25 of the second part 28.

In use, the node 22 may be electrically connected to a measurement device (not shown in FIG. 2) used for measuring a parameter of the gas turbine engine (temperature for example). The measurement device, in use, provides the (input measurement) node 22 with an electrical signal (M) 27. The electrical signal (M) 27 is received by the node 22 and provided to the first interconnect 23. The electrical signal (M) 27 is transmitted through the first interconnect 23 to the second interconnect 25 via the electrical contact at the compressed joint 29.

In an alternative embodiment, the electrical signal 27 is transmitted from the second interconnect 25 to the first interconnect 23 via the electrical contact at the compressed joint 29. The electrical signal 27 is then provided to the (output) node 22 which may be connected to a transmitter (not shown in FIG. 2) for transmitting the electrical signal 27.

It should be appreciated that in the embodiment where the node 22 is an input measurement node, the second interconnect may terminate at an output node or may connect to a third interconnect of a third part via abutting contact between the second and third interconnects at a compressed joint between the second and third parts.

FIG. 2B illustrates a plan view of the schematic diagram in FIG. 2A.

FIG. 3 illustrates a lead 21 for transmitting an electrical signal (M) 27, from a first node 22 at a turbine 42 of a gas turbine engine to a second node 44 at a compressor stage 40 of the gas turbine engine. The lead 21 comprises the first node 22, the second node 44, a first interconnect 23, and a second interconnect 25.

The first interconnect 23 is electrically connected to the first node 22. In use, the first node 22 is connected to a measurement device (not shown in FIG. 3) and is provided with an electrical signal (M) 27. In this embodiment, the first interconnect 23 is a first thin film interconnect 23. The first thin film interconnect 23 is adhered to the surface 30 of the turbine 42, the surface 47 of a first part 20a of an interconnecting shaft 20 and a surface 33 of a first flange 48 of the first part 20a of the interconnecting shaft 20. The first flange 48 is located within an intermediate stage 46 between the turbine 42 and the compressor stage 40. The intermediate stage 46 is any stage between the turbine 42 and the compressor stage 40 and may, for example, include the combustor 15.

The second interconnect 25 is electrically connected to the second node 44. In use, the second node 44 is connected to an output device (not shown in FIG. 3). The output device transmits the electrical signal (M) 27 to an operator, external to the gas turbine engine. It may be a radio transmitter. The second interconnect 25 is a second thin film interconnect 25. The second thin film interconnect 25 is adhered to a surface 32 of the compressor stage 40, to a surface 47 of a second part 20b of the interconnecting shaft 20 and to a surface 34 of a second flange 49 of the second part 20b of the interconnecting shaft 20. The second flange 49 is located within the intermediate stage 46.

The first 20a and second 20b parts of the interconnecting shaft are joined at a compressed joint 29. The surface 33 of the first flange 48 abuts the surface 34 of the second flange 49. The direction of the compression is indicated by the arrows 26. A portion of the first thin film interconnect 23 on the surface 33 abuts a corresponding portion of the second thin film interconnect 25 on the surface 34 at the compressed joint 29. The first thin film interconnect 23 and the second thin film interconnect 25 are therefore electrically connected at the joint 29, which provides a continuous electrical connection between the first node 22 and the second node 44. Therefore, the electrical signal (M), is received at the first node 22, conducted via the first and second thin film interconnects 23 and 25 respectively, to the second node 44 where it is transmitted by an output device to an operator external to the gas turbine engine 10.

The first and second thin film interconnects 23 and 25 respectively may be adhered to the surfaces of the gas turbine engine 10 by a number of methods. The methods for applying thin film are well known within the art of printed circuit boards (PCB) and the like and therefore shall not be discussed in great detail. The first and second thin film interconnects 23 and 25 respectively can be adhered to the surfaces of the gas turbine engine through painting, lacquering or through the process of photolithography.

Figure 4:
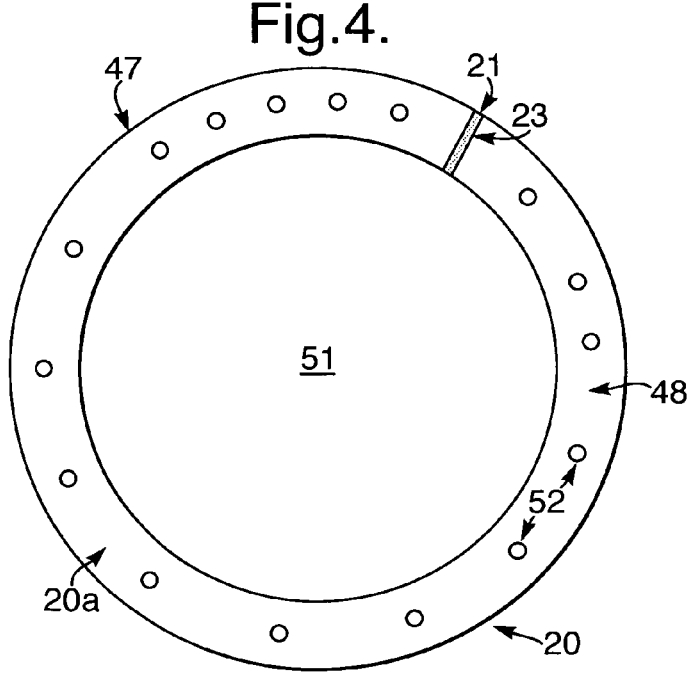
FIG. 4 illustrates a cross sectional view, at a compressed joint, of an interconnecting shaft of a gas turbine engine.

FIG. 4 illustrates an end view of the first part 20a of the interconnecting shaft 20 in FIG. 3. The second part 20b of the interconnecting shaft 20 has a corresponding end view. The first part 20a of the interconnecting shaft 20 has an exterior surface 47 having a roughly circular or elliptical cross section. The interconnecting shaft 20, in this embodiment, has a cavity 51 that has a roughly circular or elliptical cross section. The first part 20a of the interconnecting shaft 20 has an inwardly extending first flange 48. The first 48 and second 49 flanges have apertures 52 through which a bolt or other fastening means may be inserted to join the flanges together compressively. The first 23 and second 25 thin film interconnects extend radially inwards on the surfaces of the first and second flanges 48 and 49 respectively, from the surface 47.

When flanges 48 and 49 are fixed to one another, the asymmetric arrangement of the apertures 52, ensure that only one assembly configuration is possible. This is achieved by spacing the apertures 52 at irregular intervals around the circumference of the interconnecting shaft 20. This allows for the accurate alignment of a contact portion of the first thin film interconnect 23 with a contact portion of the second thin film interconnect 25.

Although embodiments of the present invention have been described in the preceding paragraphs with reference to various examples, it should be appreciated that modifications to the examples given can be made without departing from the scope of the invention as claimed. For example, the compressed joint 29 does not necessarily have to be at the interconnecting shaft, but may be at another part of the gas turbine engine 10. An interconnect may be adhered to any surface and run at any angle.

Whilst endeavoring in the foregoing specification to draw attention to those features of the invention believed to be of particular importance it should be understood that the applicant claims protection of respect of any patentable feature or combination of features hereinbefore referred to and/or shown in the drawings whether or not particular emphasis has been placed thereon.

I claim:

1. An electrical lead that transmits an electrical signal within a gas turbine engine from a node at a first component of the gas turbine engine having a first surface to a second component of the gas turbine engine having a second surface, wherein the first component and the second component are coupled at a compressed joint, and wherein the lead comprises:
    a node on the first surface of the first component;
    a first thin film interconnect, adhered to the first surface of the first component; and
    a second thin film interconnect, adhered to the second surface of the second component, wherein the first thin film interconnect and the second thin film interconnect abut at the compressed joint to provide, by their contact, a continuous electrical connection from the node to the second component.

2. An electrical lead as claimed in claim 1, wherein at least one of the first interconnect and the second interconnect comprises a thickness of less than 0.1 mm.

3. An electrical lead as claimed in claim 1, wherein at least one of the first interconnect and the second thin film interconnect comprises gold or platinum.

4. An electrical lead as claimed in claim 1, wherein the first and second components are portions of a gas turbine engine spool.

5. An electrical lead as claimed in claim 1, wherein the first component has a third abutment surface and the second component has a fourth abutment surface, and the first thin film interconnect extends over at least a portion of the third abutment surface and the second thin film interconnect extends over at least a corresponding portion of the fourth abutment surface.

6. An electrical lead as claimed in claim 5, wherein a portion of the first interconnect is adhered to the third abutment surface and a portion of the second interconnect is adhered to the fourth abutment surface.

7. An electrical lead as claimed in claim 5, wherein the compressed joint is formed by abutting contact between the third abutment surface and the fourth abutment surface.

8. An electrical lead as claimed in claim 7, wherein a portion of the first interconnect and a corresponding portion of the second interconnect abut at the compressed joint between the third abutment surface and the fourth abutment surface to provide, by their contact, a continuous electrical connection from the node to the second component.

9. An electrical lead as claimed in claim 1, wherein the first component operates at a temperature in the range of 200° C. to 800° C.

10. An electrical lead as claimed in claim 1, wherein the second component operates at a temperature in the range of ambient temperature to 750° C.

* * * * *